March 14, 1933.    M. GOLDSCHMIDT    1,901,856
ADJUSTABLE DISK CLUTCH
Filed July 7, 1930

M. Goldschmidt
INVENTOR

By Marks & Clerk
Attys.

Patented Mar. 14, 1933

1,901,856

UNITED STATES PATENT OFFICE

MAX GOLDSCHMIDT, OF FRANKFORT-ON-THE-MAIN, GERMANY, ASSIGNOR, BY DIRECT AND MESNE ASSIGNMENTS, TO THE FIRM FICHTEL & SACHS A. G., OF SCHWEINFORT-ON-THE-MAIN, GERMANY, AND MECANO GESELLSCHAFT MIT BESCHRANKTER HAFTUNG, OF FRANKFORT-ON-THE-MAIN, GERMANY

ADJUSTABLE DISK CLUTCH

Application filed July 7, 1930, Serial No. 466,232, and in Great Britain April 30, 1930.

This invention relates to disk clutches for automobile vehicles, wherein for the pressing together of the clutch surfaces, two-armed pressure levers are employed, which are actuated by a sliding sleeve on the clutch shaft. Since the pressure levers usually have unequal arms, with a high transmission ratio, a small amount of wear of the clutch surface makes itself perceptible in an altered stroke of the pressure levers. At the same time the pressure of the clutch spring upon the pressure levers consequently diminishes when the clutch is closed. The present invention enables the pressure of the clutch spring to be kept constant, notwithstanding progressive wear of the clutch surface. This is effected by dividing the sliding sleeve into two parts which can be screwed relatively to one another.

Figure 1:
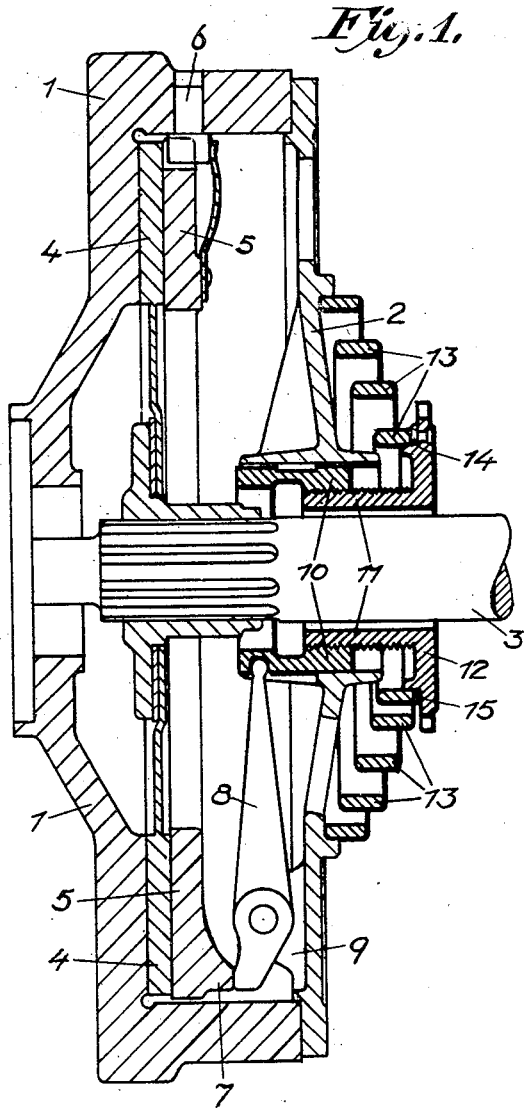
Figure 2:
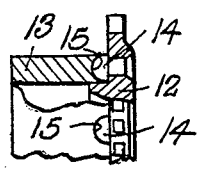

The invention is illustrated by way of example in the accompanying drawing, in conjunction with a disk clutch, and in which Fig. 1 is a longitudinal section through the vertical plane of symmetry of the clutch, and Fig. 2 is an enlarged fragmentary sectional detail view.

To a fly-wheel disk 1, connected with the engine shaft, is secured in a known manner the casing cover 2. Upon the gear shaft 3 to be coupled to the engine shaft is mounted in an axially displaceable manner the clutch disk 4, which can be pressed against the fly wheel 1 by means of a pressure ring 5. On the flywheel 1 are arranged bolts 6, which prevent relative rotation of the pressure ring 5. Against projections 7 on the pressure ring 5 there bear the shorter arms of two-armed pressure levers 8, a number of which are radially arranged in a ring, and which are pivoted in bearings 9 on the casing cover 2. The longer arms of the pressure levers 8 are embraced at their ends by recesses in a sleeve 10, which is slidable but not relatively rotatable in the central bore of the casing cover 2, being connected therewith by means of a feather key. According to the present invention the sleeve 10 is equipped with an internal screw thread, in which is screwed a second sleeve 11, which is provided with an external screw thread, and against the flange 12 of which there presses a clutch spring 13, which bears at the other end against the casing cover 2. Upon the inner side of the sleeve flange 12, one or more nipples 14 are arranged in a circle, and these nipples can snap into suitably shaped notches 15 on the innermost turn of the spring 13 bearing round the sleeve flange 12. The nipples 14 may for example be so formed, by rivet heads or screw heads, that they only permit the rotation of the sleeve 11, 12 by an expenditure of power which exceeds the influence of the vibrations occurring in ordinary use.

The wear of the clutch disk 4 occurring in use expresses itself to an extent increased according to the transmission ratio of the pressure levers 8, at the ends of the longer arms. The sliding sleeve 10, 11 therefore slides further outwards when the clutch is being closed, which corresponds to a greater relaxation of the clutch spring 13. The clutching pressure thereof therefore becomes weaker. In order to bring it up to its original magnitude, the sleeve 11 is screwed by means of a spanner into the sleeve 10, to a corresponding amount, until the nipple 14 on the flange 12 snaps into one of the notches 15 on the clutch spring 13. The adjustment of the two sleeves 10 and 11 relatively to one another is thereby secured, and the spring 13 is under substantial stress in every working condition of the clutch. An automatic rotation of the sleeve 11 in consequence of the incessant vibrations when the engine is running is accordingly not possible.

What I claim is:—

An adjustable disk clutch, comprising a fly wheel disk, a clutch disk, a pressure ring, a cover for the fly wheel disk having a hub portion, pressure levers pivoted to the inner surface of the cover and adapted to act upon the clutch disk through the pressure ring and thereby move the clutch disk against the fly wheel disk and close the clutch, a sliding sleeve consisting of two parts, one of which engages the pressure levers, and is slidably and non-rotatably connected with the hub of the cover while the other part is provided with a flange positioned exteriorly of the cover, a clutch spring arranged between the outer face of the cover and the flange of the other part of the sliding sleeve for acting upon the pressure levers collectively through the two parts of the sliding sleeve, screw threads on the two parts of the sliding sleeve enabling the two parts to be axially adjusted relatively to one another by rotating the part engaged by the clutch spring, and cooperative engaging means on the clutch spring and the flanged part of the sliding sleeve engaged thereby for hindering relative rotation of these two members.

In testimony whereof I have signed my name to this specification.

M. GOLDSCHMIDT.